May 2, 1939.  W. OWEN  2,156,864
GLASS CUTTING APPARATUS
Original Filed Nov. 4, 1937  3 Sheets—Sheet 1

INVENTOR.
WILLIAM OWEN
BY Bradley + Bee
ATTORNEYS.

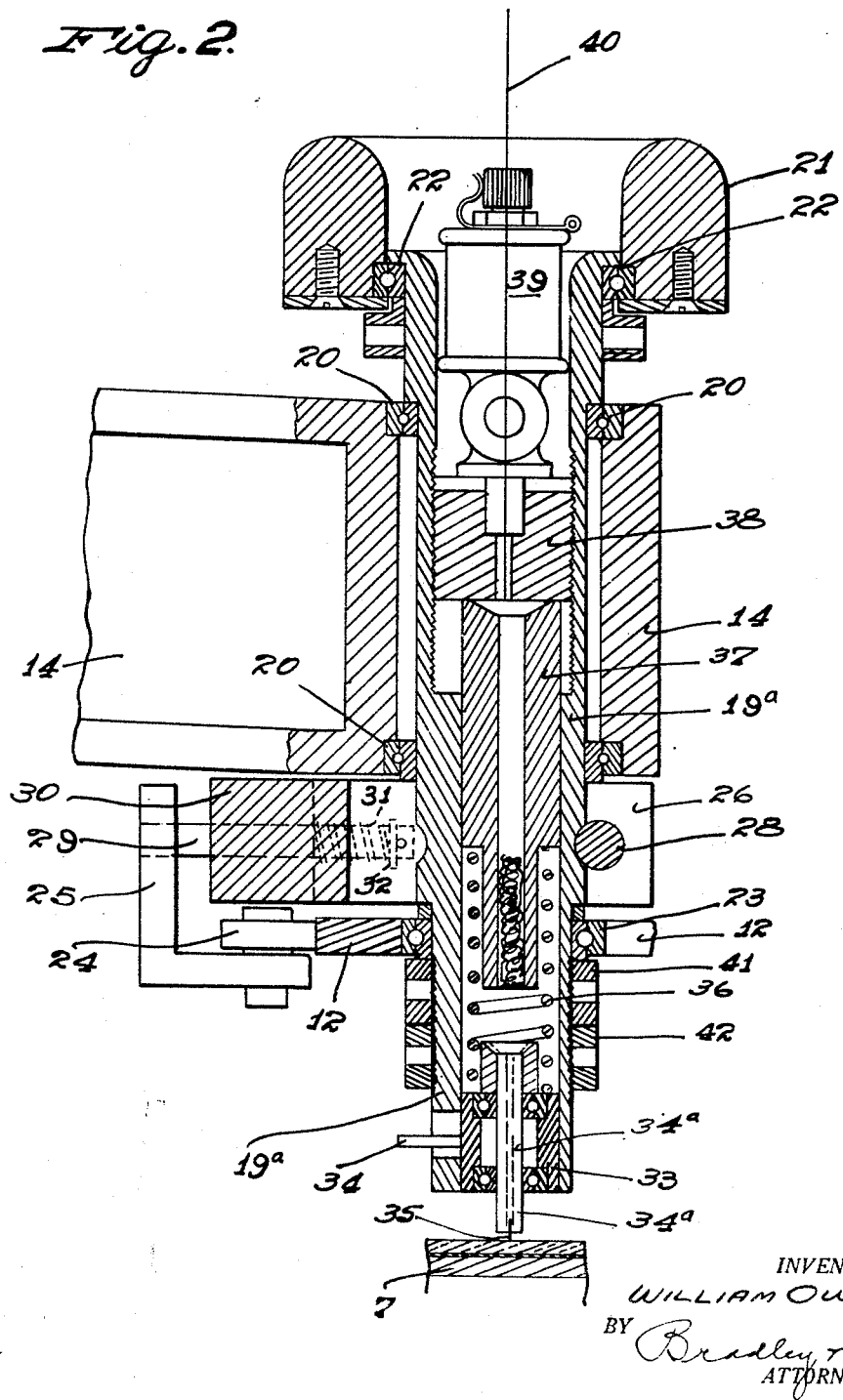

May 2, 1939.  W. OWEN  2,156,864
GLASS CUTTING APPARATUS
Original Filed Nov. 4, 1937  3 Sheets—Sheet 3
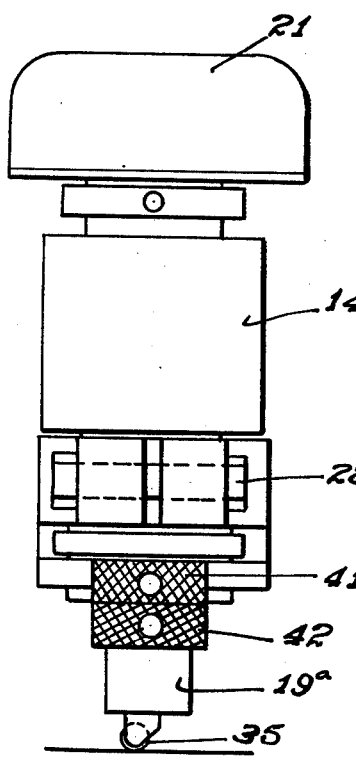
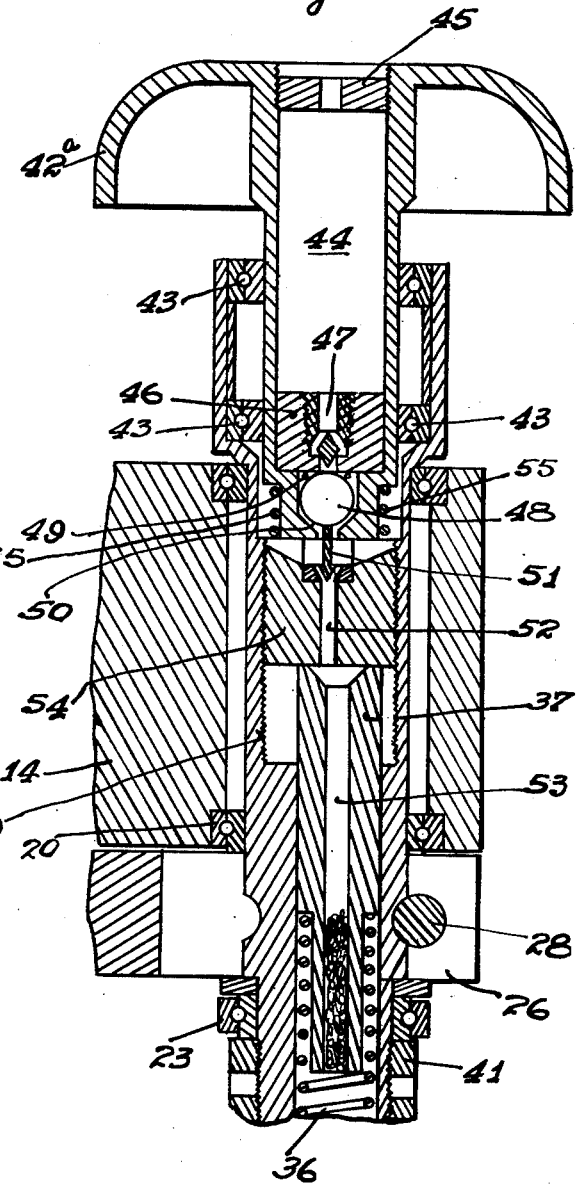
INVENTOR.
WILLIAM OWEN
BY
ATTORNEYS.

Patented May 2, 1939

2,156,864

UNITED STATES PATENT OFFICE 2,156,864

GLASS CUTTING APPARATUS

William Owen, Pittsburgh, Pa., assignor to Pittsburgh Plate Glass Company, Allegheny County, Pa., a corporation of Pennsylvania Application November 4, 1937, Serial No. 172,743
Renewed March 14, 1939

6 Claims. (Cl. 33—27)

The invention relates to glass cutting apparatus of the type shown in the patent to Norman H. Klages No. 2,048,935, dated July 28, 1936, wherein a ring-like cam or template is employed to guide the movements of a cutter head mounted for swinging movement in a horizontal plane above a vertically movable table carrying the glass sheet which is to be scored along a path governed by the cam, the head being supported against vertical movement so that the necessary movement of approach between the glass sheet and the cutter is accomplished by the movement of the table.

One object of the invention is to provide a cutter head for use in a machine of the type specified which is simpler and more compact than those heretofore proposed and in which the supply means for the cutting fluid is carried by the cylindrical barrel of the head so that any requirement for outside piping is avoided.

A further object is the provision of improved means for preventing the waste of cutting fluid when the device is not in operation, the flow being controlled by the hand of the operator in moving the head and arranged to automatically cut off such flow when the cut is completed and the hand of the operator removed.

Figure 1:
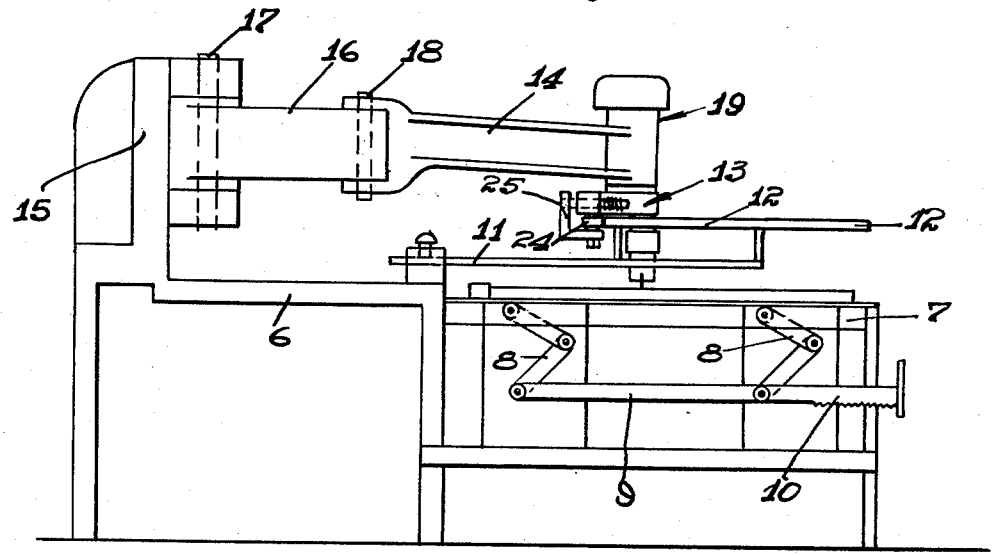
Figure 3:
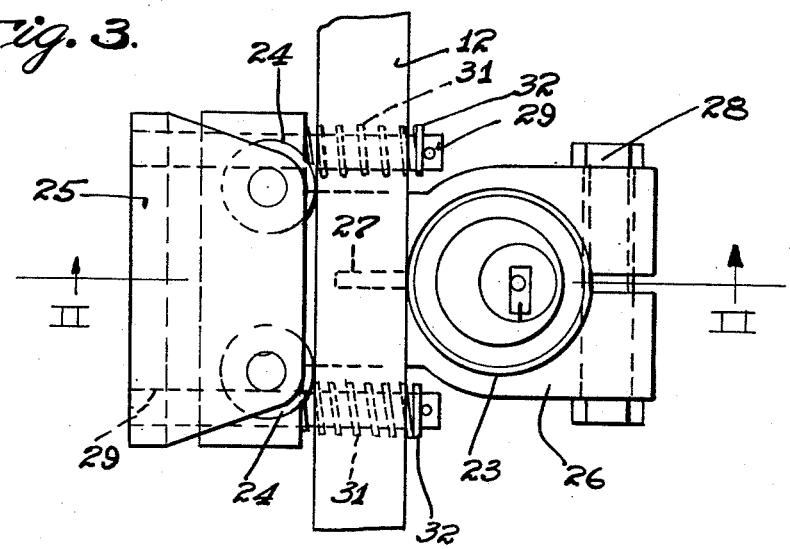

A further object is the provision of improved means for adjusting the position of the cutter tool with respect to the cam when the wear of the cam requires such adjustment. Certain embodiments of the invention are illustrated in the accompanying drawings, wherein:

Figure 1 is a side elevation showing the general arrangement of the parts of the machine. Fig. 2 is a vertical section through the cutter head on the line II—II of Fig. 3. Fig. 3 is a bottom view of the head. Fig. 4 is a side elevation of the head. And Fig. 5 is a section through a cutter head of the modified construction.

Referring to the general arrangement of parts, which is similar to that of the Klages patent heretofore referred to, 6 is the framework of the machine, and 7 is the table which carries the glass sheet and which is mounted for vertical movement to bring the glass carried on the table into and out of engagement with the cutter tool, the latter being held against vertical movement. The up and down movement of the table is accomplished by two pairs of bell crank levers 8, 8 connected to the rod 9. This rod is notched, as indicated at 10 and slides over a detent carried by the frame so that it is held in position to which it is adjusted. The table is moved up and down by moving the rod in and out. Mounted above the table on the supports 11 is the ring cam 12 which governs the movement of the cutter head and the line of cut upon the glass plate. The cutter head 13 to which the invention is particularly directed is mounted for swinging movement above the table in a horizontal plane, so that the cutter head is free to follow the contour of the cam and for this purpose is pivotally mounted upon the arm 14, which is in turn supported from the bracket 15 on the frame by means of the swinging arm 16 pivoted to the frame at 17 and to the arm 16, as indicated at 18.

The head 19 comprises a barrel 19a swivelled in the end of the arm 14 on the ball bearings 20, 20 and provided with a handle 21 swivelled at the upper end of the barrel on the ball bearing 22. The lower end of the barrel carries a sleeve or roller 23 which engages one side of the ring cam 12, while the other side of the cam is engaged by a pair of rollers pivoted on the angle bracket 25. A plate 26 slotted, as indicated at 27 (Fig. 3), fits around the barrel and is clamped thereto by the bolt 28. The bracket 25 is guided on the plate 26 by means of a pair of bolts 29 which fit slidably through the end portion 30 of the plate. Springs 31 mounted on the bolts between the portion 30 and the washers 32 draw the rollers 23 and 24 into yielding engagement with the opposite side edges of the cam ring 12.

Mounted in the extreme lower end of the barrel for sliding movement is a cutter carrier in the form of a sleeve 33 held against rotation and limited in its vertical movements by a pin 34 working in a longitudinal slot in the barrel. This sleeve 33 in turn carries a hollow spindle 34a swivelled in the sleeve, as indicated in Fig. 2, and provided with a cutting wheel 35 at its lower end. The sleeve with the spindle are yieldingly pressed downward to give the desired cutting contact between the scoring wheel 35 and the glass plate on the table 7, when the table is in raised position, by means of a spring 36. The spring abuts at its upper end a shoulder on the stem 37 slidable freely in the barrel. The stem is hollow as illustrated and is adjustable downward to tension the spring by means of a screw plug 38 threaded into the bore of the barrel. This plug is also hollow and is supplied with cutting fluid from the oil cup 39 which fits removably in the bore of the barrel. Fluid from the oil cup feeds downward to the cutting tool through the various alined passages through the parts 38, 37 and 34a. When the cutting operation on a plate is completed, the flow of fluid is stopped by removing the oil cup from the barrel and reversing its position.

The structure is arranged to permit of an adjustment of the scoring wheel 35 to compensate for slight amounts of wear which occur in the cam 12. To this end, the stem 37 is off center or eccentric with respect to the center line 40 of the cutter head barrel, as indicated in Fig. 2, so that by a rotary adjustment of the barrel, the position of the cutter wheel is shifted slightly. To make this adjustment, the clamping bolt 28 is loosened, and the barrel rotated the desired amount. To lock the barrel against endwise movement when the bolt 28 is loosened and to hold the bearing of the sleeve 23 in place, the clamping nut 41 and lock nut 42 are threaded onto the barrel. When the nut 41 is screwed up tightly against the inner bearing ring of the roller 23, this ring is pressed against a washer on the lower side of the plate 26, thus holding the bearing in position and locking the barrel from any endwise movement relative to the plate 26.

Fig. 5 illustrates a modification, wherein the handle 42a is swivelled in the upper end of the barrel on the bearings 43, and provided with a cavity 44 for the cutting fluid, the upper end carrying a screw plug 45 having a filling opening therethrough. The shank of the handle is free to slide vertically through its bearings 43 and is provided with a plug 46 having threaded therein a regulating valve 47 for restricting the downward flow of fluid. A ball valve 48 lies in a cavity beneath the passage. A spring 49 normally assists in pushing the ball downward against its seat 50, when no pressure is applied to the handle 42a. A ball trip 51 below the ball valve holds it in the position shown when the handle is pushed down, so that a flow of fluid can occur from the ball cavity through the passages 52 and 53 in the members 54 and 37. The member 54 is threaded into the cutter barrel and carries the spring 55, which normally holds the handle in its upper position permitting the valve 48 to engage its seat. The member 54 also forms an abutment or stop for the member 37, pressed upward by the spring 36, which latter functions to apply yielding pressure to the cutter carrier as in the construction of Figs. 1 to 4. The tension of the spring 36 is regulated by the adjustment up and down of the screw member or plug 54. When no cut is being made and the handle 42a is free from the pressure of the hand of the operator, the spring 55 moves such handle upward and this movement frees the ball from the trip member, so that the ball seats and cuts off the flow of cutting fluid past such trip member to the passage 52. There is thus no loss of fluid between cutting operation, and during such period, the cavity surrounding the ball fills due to a flow thereto past the regulating valve 47. When another cut is made and pressure applied to the handle 42, the parts move to the position shown, with the ball in raised position, permitting a downward flow of the fluid from the ball cavity. The member 37 is off center with respect to the cutter barrel, as in the construction of Figs. 1 to 4, to permit of the adjustment of the cutter wheel, and the means of adjustment are the same as described heretofore in connection with such construction.

What I claim is:

1. In a machine including a table for carrying a glass sheet to be cut, a support mounted above the table for movement horizontally thereover and a guide above the table for governing the movement of the support, a vertical barrel swivelled in the support, a clamping member in which the barrel is mounted for rotary adjustment carrying roller means engaging said guide, and a cutter tool swivelled on a vertical axis at the lower end of the barrel with such axis off center with respect to the center line of the barrel.

2. In a machine including a table for carrying a glass sheet to be cut, a support mounted above the table for movement horizontally thereover, and a curved cam guide mounted above the table for governing the movement of the support, a vertical barrel swivelled in the support, a clamping member in which the barrel is mounted for rotary adjustment carrying roller means engaging said cam guide, and a cutter tool swivelled on a vertical axis at the lower end of the barrel with such axis off center with respect to the center line of the barrel.

3. In a machine including a table for carrying a glass sheet to be cut, a support mounted above the table for movement horizontally thereover and a guide above the table for governing the movement of the support, a vertical barrel swivelled in the support, having a feed passage for cutting fluid therethrough, means carried by the barrel comprising roller means engaging said guide, a cutter tool swivelled at the lower end of the barrel, and a cutter fluid supply reservoir in the upper portion of the barrel in communication with said feed passage.

4. In a machine including a table for carrying a glass sheet to be cut, a support mounted above the table for movement horizontally thereover, and a guide above the table for governing the movement of the support, a vertical barrel swivelled in the support having a feed passage for cutting fluid therethrough, means carried by the barrel comprising roller means engaging said guide, a cutter tool swivelled at the lower end of the barrel and a cutter fluid supply container seated removably in the upper end of the barrel in communication with said feed passage.

5. In a machine including a table for carrying a glass sheet to be cut, a support mounted above the table for movement horizontally thereover, and a guide above the table for governing the movement of the support, a vertical barrel swivelled in the support, having a feed passage for cutting fluid therethrough, means carried by the barrel comprising roller means engaging said guide, a cutter tool swivelled at the lower end of the barrel, a cutter fluid supply reservoir in the upper portion of the barrel, a handle on the upper end of the barrel having a limited vertical movement yieldingly held in its upper position, and a cut off valve intermediate the reservoir and said passage which is opened when the handle is moved downward and which closes when the handle moves to its upper position.

6. In a machine including a table for carrying a glass sheet to be cut, a support mounted above the table for movement horizontally thereover, and a guide above the table for governing the movement of the support, a vertical barrel swivelled in the support, having a feed passage for cutting fluid therethrough, means carried by the barrel comprising roller means engaging said guide, a cutter tool swivelled at the lower end of the barrel, a handle swivelled in the upper end of the barrel and movable vertically of the barrel having a cutter fluid reservoir therein with a normally closing check valve at its lower end, means normally holding the handle at its upper limit of movement, and means fixed with relation to the barrel for opening the check valve when the handle is moved down.

WILLIAM OWEN.